(12) United States Patent  (10) Patent No.: US 6,736,577 B2
Smith et al.                (45) Date of Patent:     May 18, 2004

(54) UNIVERSAL BASSINET FITTINGS

(75) Inventors: Todd D. Smith, Arlington, WA (US);
Kwun-Wing W. Cheung, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/137,816

(22) Filed: May 1, 2002

(65) Prior Publication Data

US 2003/0206786 A1 Nov. 6, 2003

(51) Int. Cl.[7] ................................................. F16B 21/00
(52) U.S. Cl. ........................ 411/348; 411/339; 411/509; 411/913
(58) Field of Search ................................ 411/338, 339, 411/347, 348, 508, 509, 510, 913

(56) References Cited

U.S. PATENT DOCUMENTS

| | | | | |
|---|---|---|---|---|
| 3,002,368 A | * | 10/1961 | Moberg | 411/348 X |
| 3,190,168 A | * | 6/1965 | Sullivan | 411/348 |
| 3,430,305 A | * | 3/1969 | Geffner | 411/348 X |
| 3,498,653 A | * | 3/1970 | McCreery | 411/348 X |
| 5,452,979 A | * | 9/1995 | Cosenza | 411/348 |

* cited by examiner

*Primary Examiner*—Neill Wilson
(74) *Attorney, Agent, or Firm*—Black Lowe & Graham PLLC

(57) ABSTRACT

The present invention includes a sleeve for receiving a pip pin. The sleeve is configured to be embedded in a bulkhead and includes a cylindrical housing. The housing has an axis and defines a bore along that axis. There are a plurality of spaced-apart annular lands defined within the bore. Each land is arranged to engage a plurality of locking balls on a shaft of a pip pin to secure the pip pin in the bore.

18 Claims, 2 Drawing Sheets

UNIVERSAL BASSINET FITTINGS

FIELD OF THE INVENTION

This invention relates generally to fittings and, more specifically to fittings for quick release.

BACKGROUND OF THE INVENTION

Floors and bulkheads define the interior of a commercial airliner. The flight deck, for instance, is defined generally by a floor and a bulkhead separating the flight crew from the main cabin and from the luggage storage area. Likewise, the main cabin of an airliner is separated from the flight deck and from the luggage compartment by a floor and one or more bulkheads.

Because of the rigors of flight, furnishings in the main cabin of a commercial airliner are generally attached either to the floor or one of the bulkheads. Passenger seats, for instance, are fixed to the floor to prevent movement in flight. This fixation occurs by anchoring the seats in configured rows to the floor with a plurality of fasteners.

For younger passengers, airlines will often provide a bassinet. A bassinet is a small rigid mattress suspended from a framework generally by fabric. The framework, in turn, is generally secured to a bulkhead for stability. Because of FAA regulations, a child must be in the arms of an adult rather than in the bassinet during takeoff and landing. For this reason, the bassinet is generally stowed until the airliner reaches its cruising altitude.

At cruising altitude, generally, a flight attendant will anchor the framework of the bassinet to the bulkhead by means of a quick-release fastener. The quick-release fastener facilitates rapid installation and removal of the bassinet as flight conditions allow or demand the same. The most prevalent quick-release fastener used is a pip pin.

The pip pin is a straight pin with locking balls extending from a shaft. Depressing a button located at the opposite end of the shaft retracts the locking balls allowing the pip pin to slide into or out of a receiving sleeve installed in the bulkhead. When the pip pin is slid into the receiving sleeve, the release of the button extends the locking balls into recesses within the bore of the sleeve thereby locking the pin and any load that the pin passes through to the bulkhead. The pin and the load are as easily released from the bulkhead by re-pressing the button thereby retracting the locking balls.

Currently, two major manufacturers supply airlines with bassinets. While these bassinets use pip pins of similar diameters, the distance of the locking balls along the shaft differs from one manufacturer to the other. The use of one manufacturer's pin in a sleeve designed to receive the other manufacturer's pin results either in an inability of the locking balls to extend into the recesses of the sleeve thereby allowing the pin to readily slip out of the receiving sleeve or, conversely, the balls may extend too far down the shaft and not give a secure fit resulting in early failure of the pins to secure the load. In either regard, the bassinet and its precious cargo may fall to the floor of the cabin.

Generally, airlines allow manufacturers to install bulkheads in ordered airplanes along with such fittings as the airline deems appropriate. In operation, the airline will supply a bassinet according to the airline's needs. Because the bassinets are not supplied with the uninstalled sleeves, a likelihood of confusion exists.

There exists, then, an unmet need in the art to provide a receiving sleeve that will securely hold the pip pins provided by both major bassinet manufacturers.

SUMMARY OF THE INVENTION

The present invention is a sleeve for receiving a pip pin. The sleeve includes a cylindrical housing. The housing has an axis and defines a bore along the axis. A plurality of spaced-apart annular lands to defined within the bore. Each land is arranged to engage a plurality of locking balls on a shaft of a pip pin to secure the pip pin in the bore.

The present invention allows rapid secure fixation of a load to a bulkhead, without reference to which of two pins will secure the load. The load is securely fixed with either of two pins of appropriate diameter.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, the present invention is a sleeve for receiving a pip pin. The sleeve includes a cylindrical housing. The housing has an axis and defines a bore along the axis. A plurality of spaced-apart annular lands are defined within the bore. Each land is arranged to engage a plurality of locking balls on a shaft of a pip pin to secure the pip pin in the bore.

Figure 1:
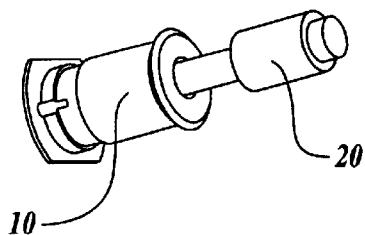
FIG. 1 is a perspective view of a pip pin in place within the inventive sleeve.

Referring now to FIG. 1, there are presently two principle components of the securing system. A securing sleeve 10 and a pip pin 20 is inserted within the securing sleeve The pip pin 20 is suitably any acceptable pip pin currently known in the art. Details of construction and operation of the pip pin 20 are provided above. Not shown in this figure is a load secured by the pip pin 20 when inserted into the sleeve 10. The shaft of the pip pin 20 shows space for bearing such a load.

Figure 2A:
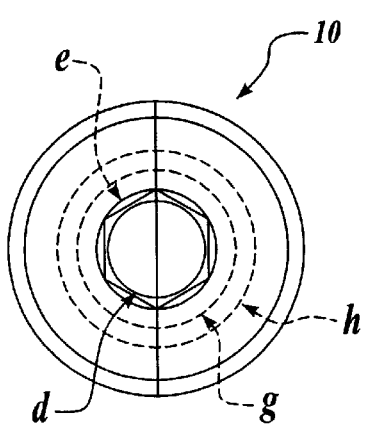
FIG. 2a is an axial view of the invention.
Figure 2B:
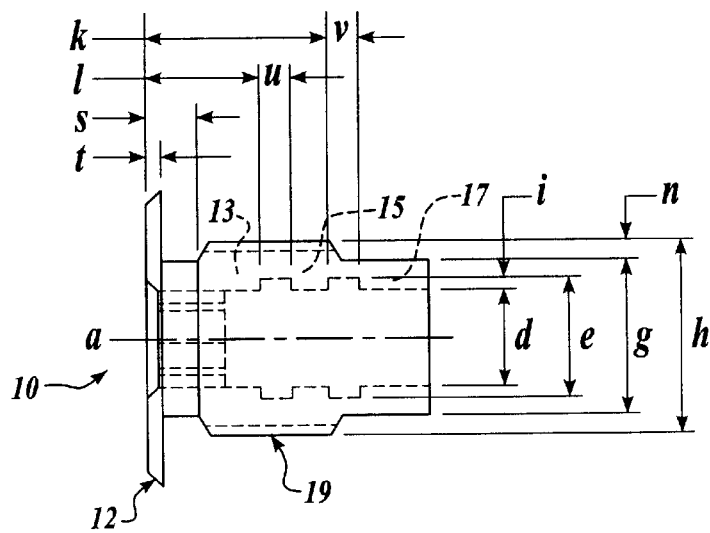
FIG. 2b is a cross-sectional view of the invention.

Referring now to FIGS. 2a and 2b, the axial and cross-sectional views of the sleeve 10, display the dimensions of a preferred embodiment of the inventive apparatus. The sleeve is a cylinder with axis a and defining lands 13, 15 and 17. The lands 13, 15, and 17 extend inward defining a second diameter, that is a receiving diameter d. The lands 13, 15, and 17, are spaced apart at distances u and v to define recesses for receiving the locking balls (not shown) of a suitable pip pin.

To facilitate mounting the sleeve 10 into a bulkhead (not shown), a shoulder 19 of diameter h as well as a flange 12 of thickness of t are provided. The inner surface of the flange is offset from the shoulder by a suitable distance s. Alternately, the sleeve can be affixed in a hole in a bulkhead with a suitable adhesive. The shoulder 19 will provide an adhering surface for adhesive mounting.

Two offset distances that relate to the securing function of the sleeve 10 are at distances k and l. The offset distances k and l represent the offset from the outer face of the flange 12 to the inner surface of the defined lands 15 and 13, respectively. These offsets define the insertion distance for the pip pin 20 in a secured position. When added to such length along the shaft as the load will occupy, these two dimensions define the grip length of the pip pin 20 when inserted into the sleeve 10. So configured, the sleeve 10 in a preferred embodiment provides two distinct grip lengths for pip pins inserted in the secured position within the sleeve 10.

Figure 3:
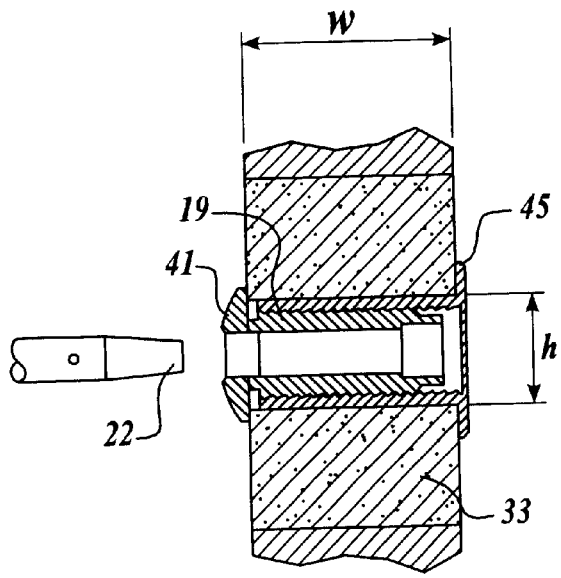
FIG. 3 is a cross-section of the invention residing in a bulkhead.

Referring now to FIG. 3, the sleeve 10 is mounted within a bulkhead 33 of width w. In a preferred embodiment of the invention, the sleeve 10 is suitably flanged and threaded along its outer surface. A second flange sleeve 45 is threaded internally and threadedly engaged with the threads of the outer surface of the sleeve assembly 41. The second flanged cylinder 45 is then twisted and torqued such that the distance between the inner surfaces of the flanges approximates the width of the bulkhead w providing a snug fit in a hole with diameter h. Affixing the sleeve assembly 41 to the bulkhead 33 with a threaded sleeve 45 is a presently preferred method of removably mounting the inventive device in a bulkhead. The insertion point of a pip pin 22 is shown to demonstrate the availability of the sleeve assembly 41 when mounted upon the bulkhead 33 in this preferred manner. Permanent attachment is achieved by adhesively mounting the sleeve assembly 41

Figure 4:
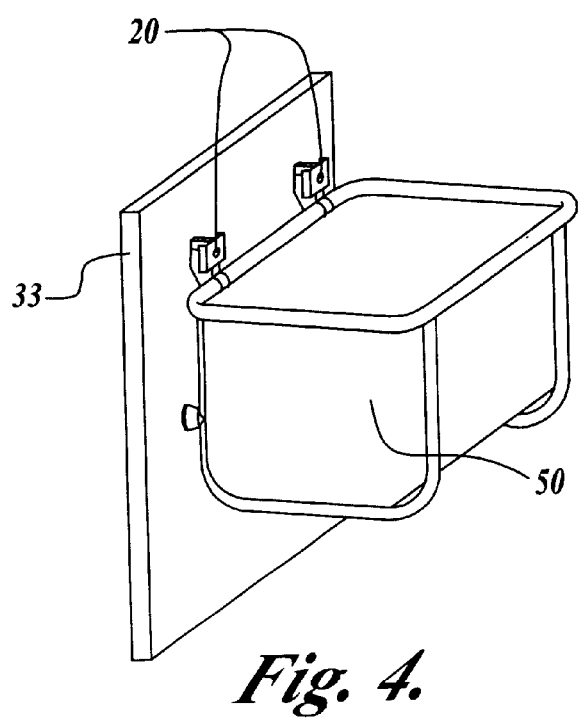
FIG. 4 is a perspective view of an application of the invention.

FIG. 4 demonstrates the utility of the securing system to secure a payload to a bulkhead. In this instance, the payload is a bassinet 50 secured to a bulkhead 33 by means of pip pins 20. Pip pins 20 of two distinct grip lengths can be used to secure the bassinet 50 to the bulkhead 33 without fear that the grip strength of the pip pin will be compromised by an incorrect matching of pip pin 20 and sleeve (not shown).

While the preferred embodiment of the invention has been illustrated and described, as noted above, many changes can be made without departing from the spirit and scope of the invention. Accordingly, the scope of the invention is not limited by the disclosure of the preferred embodiment.

What is claimed is:

1. A sleeve for receiving a pip pin, the sleeve comprising:
   a cylindrical housing, the housing being configured for being embedded in a bulkhead and having an axis and defining a bore along the axis; and
   a plurality of spaced-apart annular lands defined within the bore, each land being arranged to engage a plurality of locking balls on a shaft of a pip pin to secure the pip pin in the bore.

2. The sleeve of claim 1, wherein the lands define a plurality of annular grooves therebetween.

3. The sleeve of claim 1, wherein the lands define a plurality of sockets for the locking balls.

4. A The sleeve of claim 1, wherein the sleeve is fixedly secured in a bulkhead by an adhesive.

5. The sleeve of claim 1, wherein the cylindrical housing further includes a first end and a flange defined at the first end.

6. The sleeve of claim 1, wherein the cylindrical housing further includes an exterior surface and
   the exterior surface defines a threaded groove spirally situated about the exterior surface; and wherein a threaded sleeve in a bulkhead is threadedly engaged with the threaded groove such that the cylindrical housing is secured in a bulkhead.

7. The sleeve of claim 1, wherein the cylindrical housing further includes an exterior surface and
   the exterior surface defines a threaded groove spirally situated about the exterior surface; and wherein a bulkhead defines a threaded bore threadedly engaged with the threaded groove such that the cylindrical housing is secured in the bulkhead.

8. The sleeve of claim 1, wherein the pip secures a load to the sleeve.

9. The sleeve of claim 8, wherein the load is a bassinet.

10. A fitting for securing a bracket with a pip pin, the fitting comprising:
    a pip pin having a diameter and length;
    a cylindrical sleeve defining a cylindrical bore and having an axis;
    a plurality of spaced-apart annular lands having a height and being defined within the bore the plurality of the lands defining a plurality of apertures to frictionally engage locking balls of the pip pin at a plurality of spaced-apart locations along the axis within the bore; and
    a bracket defining an aperture to receive the pip pin therein, the bracket being inserted between the pip pin and the sleeve such that the bracket is secured to the sleeve by insertion of the pip pin therethrough.

11. The fitting of claim 10, wherein the bracket supports a load.

12. The fitting of claim 11, wherein the load is a bassinet.

13. The system of claim 10, wherein the pip pin is one of a plurality of pip pins having a plurality of different lengths.

14. The system of claim 10, wherein the cylindrical sleeve is attached to a bulkhead.

15. A method for securing a pip pin to a sleeve, the method comprising:
    a sleeve having a bore into a bulkhead, the sleeve defining a plurality of spaced-apart annular lands within the bore;
    retracting a plurality of locking balls on a shaft of a pip pin;
    inserting the pip pin within the bore;
    extending the locking balls on the shaft of the pip pin; and
    engaging the locking balls against one of the plurality of annular lands such that the pip pin is secured to the sleeve.

16. The method of claim 15, wherein embedding the sleeve into the bulkhead is includes threadedly securing the sleeve to a bulkhead.

17. The method of claim 15, further comprising threading the pip pin through a load such that upon securing the pip pin the load is secured to the sleeve.

18. The method of claim 17, wherein the load is a bassinet.

* * * * *